(12) United States Patent
Komine et al.

(10) Patent No.: US 12,342,163 B2
(45) Date of Patent: Jun. 24, 2025

(54) ON-BOARD EQUIPMENT CONTROL DEVICE AND ON-BOARD EQUIPMENT CONTROL METHOD

(71) Applicants: Nissan Motor Co., Ltd., Yokohama (JP); RENAULT S.A.S., Boulogne-Billancourt (FR)

(72) Inventors: Maiko Komine, Kanagawa (JP); Naoto Kajiyama, Kanagawa (JP); Sou Tamura, Kanagawa (JP); Tomokazu Furuya, Kanagawa (JP); Hiroshi Nishimura, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 196 days.

(21) Appl. No.: 18/256,245

(22) PCT Filed: Dec. 17, 2020

(86) PCT No.: PCT/IB2020/001102
§ 371 (c)(1),
(2) Date: Jun. 7, 2023

(87) PCT Pub. No.: WO2022/129970
PCT Pub. Date: Jun. 23, 2022

(65) Prior Publication Data
US 2024/0022904 A1  Jan. 18, 2024

(51) Int. Cl.
*G06F 21/00* (2013.01)
*H04L 9/40* (2022.01)
*H04W 12/06* (2021.01)

(52) U.S. Cl.
CPC ......... *H04W 12/06* (2013.01); *H04L 63/0861* (2013.01)

(58) Field of Classification Search
CPC ... H04W 12/06; H04L 63/0861; B60R 16/037
See application file for complete search history.

(56) References Cited

U.S. PATENT DOCUMENTS 7,471,929 B2   12/2008  Fujioka et al.
8,521,378 B2 *  8/2013  Steinhauser .......... F16H 63/483
                                                  701/53

(Continued)

FOREIGN PATENT DOCUMENTS

JP   2020-155138 A    9/2020
WO   2005/069675 A1   7/2005

OTHER PUBLICATIONS

Extended European Search Report of Jan. 2, 2024 of corresponding European Patent Application No. 20965816.0.

*Primary Examiner* — Kendall Dolly
(74) *Attorney, Agent, or Firm* — Global IP Counselors, LLP

(57) ABSTRACT

An on-board equipment control device includes a storage device a storage device and a controller. The controller performs a first authentication based on a signal transmitted from a wireless device held by a user and performs a second authentication based on biometric data of the user. The controller executes the first authentication before the user boards the vehicle and executes the second recognition after the user boards the vehicle. The controller determines whether the user identified by the first and second authentications are the same user. The controller controls the first on-board equipment or the first functions of the on-board equipment based on the user identified by the first and second authentications.

13 Claims, 7 Drawing Sheets

(56) References Cited

U.S. PATENT DOCUMENTS

| | | | |
|---|---|---|---|
| 9,707,911 B1* | 7/2017 | Myers | B60R 16/037 |
| 10,377,345 B1* | 8/2019 | Oesterling | H04W 4/80 |
| 11,040,619 B1* | 6/2021 | Martin | G06T 7/593 |
| 2009/0318263 A1* | 12/2009 | Yuet | B60T 7/16 |
| | | | 701/99 |
| 2015/0197205 A1* | 7/2015 | Xiong | B60R 16/037 |
| | | | 701/49 |
| 2017/0136967 A1* | 5/2017 | Park | B60R 16/0238 |
| 2018/0018179 A1* | 1/2018 | Scheufler | H04L 67/306 |
| 2018/0151011 A1* | 5/2018 | Ichida | G07C 9/25 |
| 2021/0300404 A1* | 9/2021 | Bruckmeier | B60K 35/25 |
| 2022/0397086 A1* | 12/2022 | Inokuchi | B60H 1/00771 |

* cited by examiner

| AUTHENTICATION METHOD | EQUIPMENT/FUNCTIONS TO BE CONTROLLED |
|---|---|
| KEY ID | • IVI<br>• SEAT<br>• MIRROR<br>• STEERING WHEEL<br>• METER<br>• HUD<br>• AIR CONDITIONING DEVICE |
| FACE ID | • IVI (AUTO-LOGIN)<br>• SWITCH TO GUEST MODE |

FIG. 2

| AUTHENTICATION METHOD | EQUIPMENT/FUNCTIONS TO BE CONTROLLED |
|---|---|
| KEY ID | • SEAT<br>• MIRROR<br>• STEERING WHEEL<br>• METER<br>• HUD<br>• AIR CONDITIONING DEVICE |
| FACE ID | • IVI |

FIG. 5

| SETTING DATA | ENVIRONMENTAL DATA | | |
| --- | --- | --- | --- |
| | PERSON | INSIDE VEHICLE | OUTSIDE VEHICLE |
| HVAC | CLOTHING, BODY TEMPERATURE NUMBER OF OCCUPANTS | CABIN TEMPERATURE | DATE AND TIME, SEASON, WEATHER |
| DISPLAY BRIGHTNESS | | BRIGHTNESS INSIDE VEHICLE | DATE AND TIME, TIME OF DAY, SEASON, WEATHER |
| AUDIO SETTINGS (PLAYLIST) | NUMBER OF OCCUPANTS | | DAY OF WEEK, TIME OF DAY |
| AUDIO SETTINGS (VOLUME) | NUMBER OF OCCUPANTS | | |
| IVI LOGIN | NUMBER OF OCCUPANTS | | |

FIG. 7

ND-BOARD EQUIPMENT CONTROL
DEVICE AND ON-BOARD EQUIPMENT
CONTROL METHOD

CROSS-REFERENCE TO RELATED
APPLICATIONS

This application is a U.S. national stage application of International Application No. PCT/IB2020/001102, filed on Dec. 17, 2020.

BACKGROUND

Technical Field

The present invention relates to an on-board equipment control device and an on-board equipment control method.

Background Information

An invention in which a driver's face is authenticated and the mode of a mobile phone is switched based on the authentication result is known from the prior art (International Publication No. 2005/069675—Patent Document 1).

SUMMARY

Consider using the invention disclosed in Patent Document 1 to control on-board equipment based on a facial authentication result. However, since facial authentication becomes possible after an occupant has boarded the vehicle, it takes time to complete the control of the on-board equipment.

In view of the problem described above, an object of the present invention is to provide an on-board equipment control device and an on-board equipment control method that enables quick control of on-board equipment or the functions of on-board equipment.

An on-board equipment control device according to one aspect of the present invention performs a first authentication based on a signal transmitted from a wireless device held by a user, performs a second authentication based on biometric data of the user, refers to a storage device based on the first authentication to read first setting data, uses the first setting data to control on-board equipment or the functions of on-board equipment, refers to a storage device based on the second authentication to read second setting data, and uses the second setting data to control the on-board equipment or the functions of the on-board equipment.

By way of the present invention, on-board equipment or the functions of on-board equipment can be quickly controlled.

BRIEF DESCRIPTION OF THE DRAWINGS

Referring now to the attached drawings which form a part of this original disclosure.

FIG. 2 is a diagram showing an example of on-board equipment compatible with an authentication method.

FIG. 5 is a diagram showing another example of on-board equipment compatible with an authentication method.

FIG. 7 is a diagram explaining a relationship between on-board equipment and environmental data.

DETAILED DESCRIPTION

Figure 1:
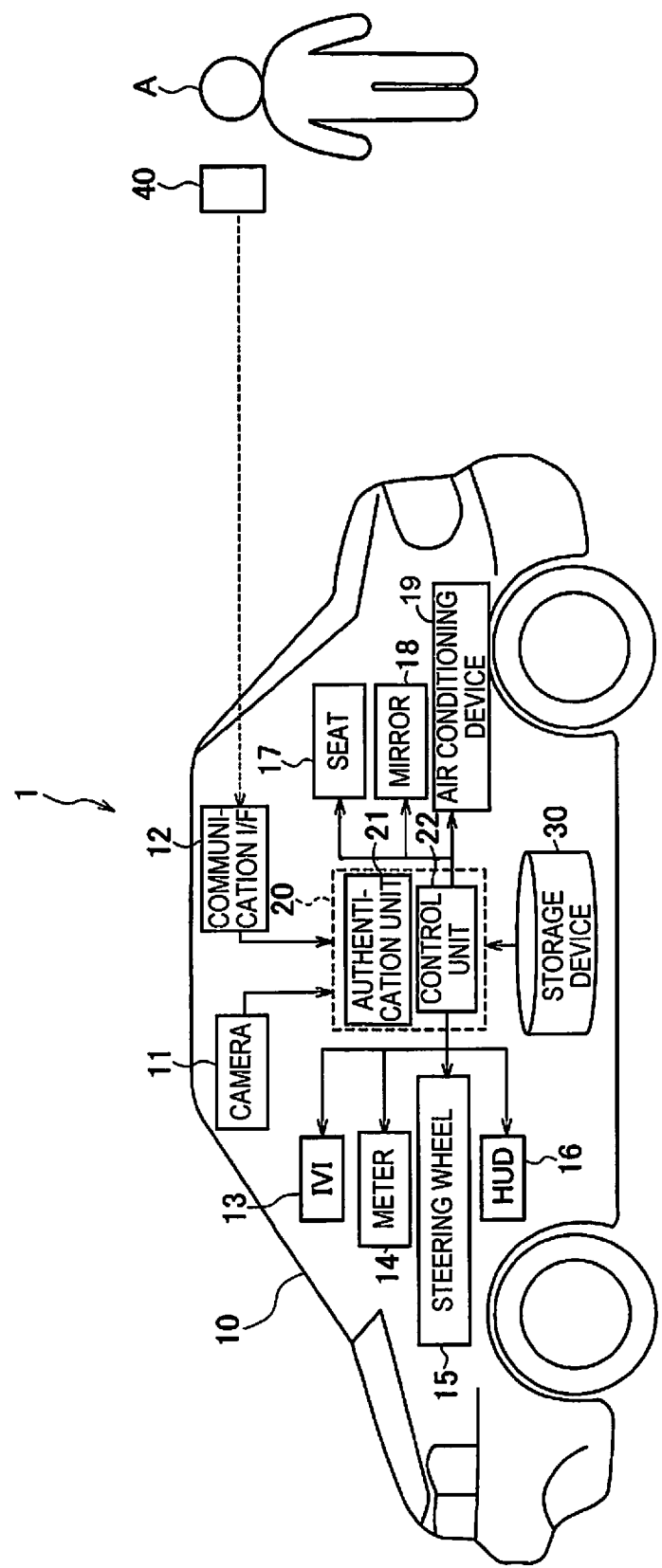
FIG. 1 is a block diagram of an on-board equipment control system according to an embodiment of the present invention.

An embodiment of the present invention is described below with reference to the figures. In the descriptions of the figures, identical parts have been assigned the same reference numerals, and their descriptions have been omitted.

A configuration example of an on-board equipment control system according to the present embodiment will be described with reference to FIG. 1. As shown in FIG. 1, the on-board equipment control system includes an on-board equipment control device 10 mounted on a vehicle 1, a user A, and a terminal device 40 in possession of the user A.

As shown in FIG. 1, the on-board equipment control device 10 is equipped with a camera 11, a communication I/F 12, an IVI 13, a meter 14, a steering wheel 15, an HUD 16, a seat 17, a mirror 18, an air conditioning device 19, a storage device 30, and a controller 20.

The camera 11 is installed inside the vehicle. More specifically, the camera 11 is installed in a position in which the driver's face can be photographed. The driver here refers to an occupant sitting in the driver's seat. The camera 11 has sensors such as a CCD (charge-coupled device), CMOS (complementary metal oxide semiconductor), and the like. An image captured by the camera 11 is output to the controller 20.

The communication I/F 12 is implemented as hardware, such as a network adapter, various types of communication software, or a combination thereof, and is configured to realize wireless communication. The communication I/F 12 communicates with the terminal device 40 in possession of the user A. An example of the terminal device 40 is an intelligent key. Intelligent keys are used to remotely control the unlocking and locking of doors. When the user A presses an unlock switch of the intelligent key, a signal is sent to the vehicle 1. When this signal is received by the communication I/F 12, all the doors of the vehicle 1 are unlocked. Intelligent keys are sometimes called smart keys.

The terminal device 40 is not limited to an intelligent key. The terminal device 40 may be a smartphone. If the terminal device 40 is a smartphone, known technology can be used to provide the smartphone with a door unlocking function. This allows the smartphone to have the same functionality as an intelligent key. When the user A presses a virtual door unlock button displayed on the smartphone, a signal is sent to the vehicle 1. When this signal is received by the communication I/F 12, all the doors of the vehicle 1 are unlocked.

In the following description, the terminal device 40 is described as an intelligent key, but, as described above, the terminal device 40 may be a smartphone.

The controller 20 is an electronic control unit (ECU) having a CPU (Central Processing Unit), a ROM (Read Only Memory), a RAM (Random Access Memory), a CAN (Controller Area Network) communication circuit, etc. A computer program is installed in the controller 20 to make it function as the on-board equipment control device 10. By executing the computer program, the controller 20 functions as a plurality of information processing circuits included in the on-board equipment control device 10. Here, an example is shown in which the plurality of information processing circuits included in the on-board equipment control device 10 is realized in software, but the information processing circuits can of course comprise dedicated hardware for executing each of the information processes shown below. Further, the plurality of information processing circuits may be realized in discrete hardware. The controller 20 has an authentication unit 21 and a control unit 22 as the plurality of information processing circuits.

The authentication unit 21 authenticates who the user is. In the present embodiment, authentication is performed twice.

First, a first authentication will be described. The first authentication is authentication by using an intelligent key. The authentication unit 21 authenticates the user based on an identification signal transmitted from the intelligent key. The identification signal transmitted from the intelligent key is stored in the storage device 30 in advance. When the identification signal is transmitted from the intelligent key, the authentication unit 21 refers to the storage device 30 in order to identify the transmitted identification signal. Hereinbelow, the identification signal transmitted from the intelligent key may be referred to as "KEY ID." The KEY ID and information about the user in possession of the intelligent key relating to this KEY ID are associated with each other and stored in the storage device 30 in advance.

To identify the identification signal transmitted from the intelligent key means to identify the user that unlocked the door. In the example described here, the user that unlocked the door is authenticated as the user A.

A second authentication will be described next. The second authentication is facial authentication. The authentication unit 21 authenticates the user based on an image transmitted from the camera 11. This image shows a user's face. Users' facial data are stored in the storage device 30 in advance. The users' facial data are registered as a database. The registered facial data are, for example, the owner of the vehicle 1 and the owner's family members. Alternatively, if the vehicle 1 is a vehicle that is rented for a fee, the registered facial data are users who frequently use the rental service.

When an image is transmitted from the camera 11, the authentication unit 21 refers to the storage device 30 in order to determine whether the facial data appearing in the image are registered in the database. If the facial data match the database, the authentication unit 21 authenticates the user. In the example described here, the user that sits in the driver's seat is authenticated as the user A.

In the following description, the authentication by using the intelligent key may be referred to as "first authentication," and the authentication by using facial data may be referred to as "second authentication." The authentication unit 21 outputs information relating to the authentication result to the control unit 22.

The control unit 22 controls equipment installed in the vehicle 1 and functions of the equipment based on the result of the authentication carried out by the authentication unit 21. Examples of equipment installed in the vehicle 1 include the IVI 13, the meter 14, the steering wheel 15, the HUD 16, the seat 17, the mirror 18, and the air conditioning device 19. Hereinbelow, equipment installed in the vehicle 1 is referred to as "on-board equipment."

The procedure to control the on-board equipment will be described. First, the control unit 22 identifies the on-board equipment and the functions of the on-board equipment to be controlled in association with the first authentication. The on-board equipment and the functions of the on-board equipment associated with the first authentication are stored in the storage device 30 in advance. Here, the on-board equipment and the functions of the on-board equipment associated with the first authentication will be described with reference to FIG. 2. As shown in FIG. 2, as an example, the on-board equipment associated with the first authentication are the IVI 13, the seat 17, the mirror 18, the steering wheel 15, the meter 14, the HUD 16, and the air conditioning device 19. IVI (on-board infotainment) refers to a device composed of hardware and software that provide route guidance and entertainment including radio, audio, and video. In the present embodiment, the IVI 13 has a login function. Users can use their own ID to log into the IVI 13 in order to use personalized functions. HUD (Head-Up Display) is a device that uses the windshield as a display screen. In the present embodiment, the phrase "on-board equipment and the functions of the on-board equipment" may be replaced with "on-board equipment or the functions of the on-board equipment."

The functions of the on-board equipment will now be described. Examples of the functions of the IVI 13 include font size settings, screen brightness settings, volume settings, sound effect settings, map view settings, icon settings, route guidance settings, radio settings, play list settings, Bluetooth connection settings, and the like. Map view settings mean setting the angle at which the map is viewed, for example. Route guidance settings means a setting relating to whether toll roads can be used and a setting relating to shortest distance. Radio settings mean setting favorite radio stations, for example.

The functions of the seat 17 include adjusting its position or angle. The functions of the mirror 18 include adjusting its position or angle. The functions of the steering wheel 15 include adjusting its position or angle. The functions of the meter 14 include view settings, content settings, and the like. Content settings include display of information relating to the travel lane, display of information on the surroundings, and the like. The functions of the HUD 16 include view settings, content settings, and the like. The functions of the air conditioning device 19 include temperature settings of the air conditioner or the heater. In the present embodiment, "controlling functions of the on-board equipment" means controlling such functions.

In the present embodiment, a user can set the on-board equipment and the functions of the on-board equipment associated with the first authentication in accordance with his or her preferences. Then, the setting data set by the user with respect to the on-board equipment and the functions of the on-board equipment are stored in the storage device 30 in association with user information. That is, setting data exist for each user. When the user A is authenticated by using the first authentication, the control unit 22 reads, from among the setting data of the authenticated user A, the setting data related to the on-board equipment and the functions of the on-board equipment associated with the first authentication. Then, the control unit 22 controls the on-board equipment based on the setting data. By using the present embodiment, the on-board equipment is controlled before the user A boards the vehicle. As a result, when the user A boards the vehicle, the IVI 13, the meter 14, the steering wheel 15, the HUD 16, the seat 17, the mirror 18, and the air conditioning device 19 can be in an already-adjusted state. That is, by using the present embodiment, quick control of on-board equipment is realized.

Figure 3:
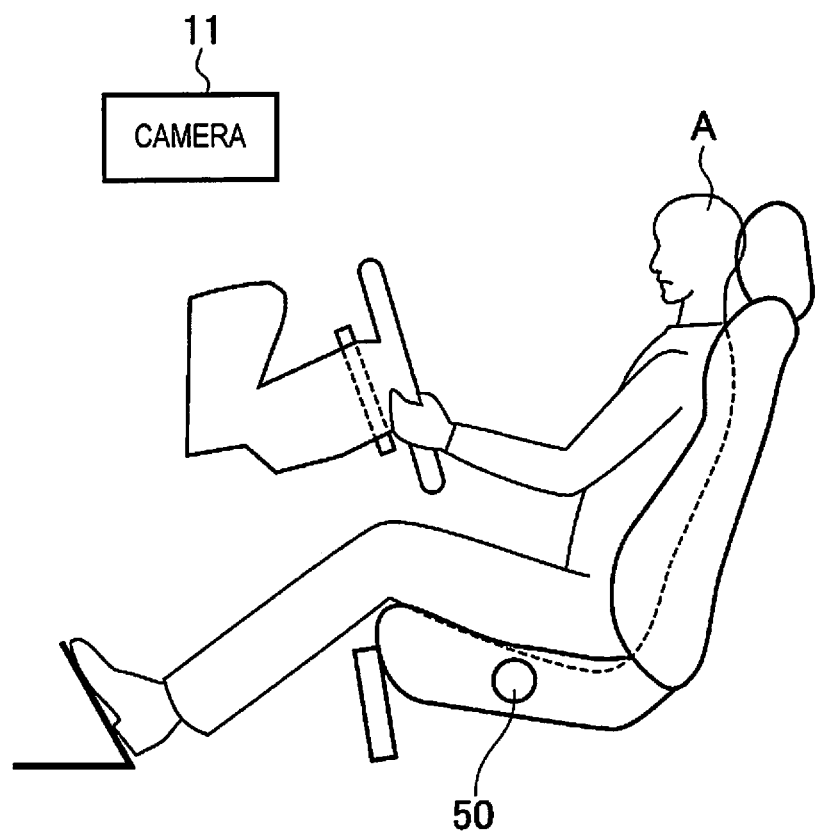
FIG. 3 is a diagram showing an example of a seating detection method.

When the user A boards the vehicle 1, the camera 11 photographs the face of the user A. A seat occupancy sensor determines whether the user A has boarded the vehicle 1. As shown in FIG. 3, when the user A boards the vehicle 1, a seat occupancy sensor 50 detects pressure. When pressure is detected, it is determined that the user A has boarded the vehicle 1. When it is determined that the user A has boarded the vehicle 1, the camera 11 photographs the face of the user A. Then, facial data processing is performed.

The determination of whether the user A has boarded is not limited to a method of using a seat occupancy sensor. It suffices if the boarding of the user A can be detected. For example, whether the user A has boarded may be determined by using a door open/close sensor. In this case, when it is detected that a door was opened and then closed, it is determined that the user A has boarded, and the camera 11 photographs the face of the user A.

Thereafter, the control unit 22 identifies the on-board equipment and the functions of the on-board equipment to be controlled in association with the second authentication. The on-board equipment and the functions of the on-board equipment associated with the second authentication are stored in the storage device 30 in advance. Here, the on-board equipment and the functions of the on-board equipment associated with the second authentication will be described with reference to FIG. 2. The on-board equipment associated with the second authentication is the IVI 13. The functions of the on-board equipment associated with the second authentication include auto-login of the IVI 13. In the control of the second authentication, the user's setting data include auto-login of the IVI 13.

According to the present embodiment, the functions of the IVI 13, the meter 14, the steering wheel 15, the HUD 16, and the seat 17, the mirror 18, and the air conditioning device 19 are adjusted before the user A boards the vehicle, and auto-login of the IVI 13 is performed after the user A has boarded.

The switch to guest mode shown in FIG. 2 is a control performed when the user identified by using the first authentication is different from the user identified by using the second authentication. The details will be described further below.

Figure 4:
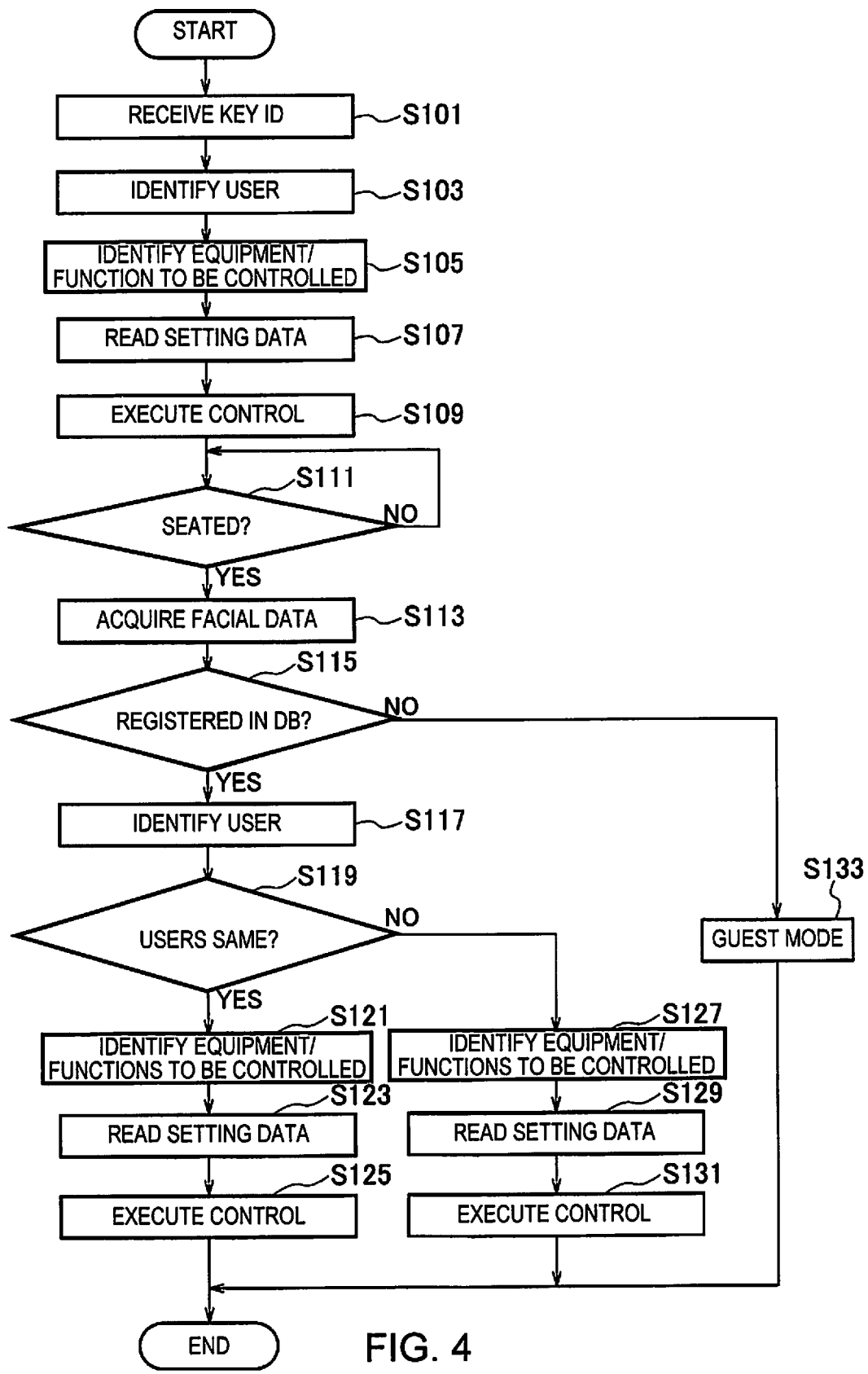
FIG. 4 is a flowchart explaining an operation example of an on-board equipment control device 10.

An operation example of the on-board equipment control device 10 will now be described with reference to the flowchart of FIG. 4.

When the user A boards the vehicle 1, the user A remotely unlocks the door. An intelligent key is used at this time. When the communication I/F 12 receives a KEY ID from the intelligent key, all the doors of the vehicle 1 are unlocked (Step S101).

The authentication unit 21 refers to the storage device 30 in order to identify the KEY ID received in Step S101. The KEY ID and the user information are associated with each other. Thus, when the KEY ID is identified, the user is also automatically identified. Here, it is assumed that the user who unlocked the door is authenticated as the user A (Step S103). The authentication unit 21 outputs the authentication result to the control unit 22.

In Step S105, the control unit 22 identifies the on-board equipment and the functions of the on-board equipment to be controlled in association with the first authentication. As an example, the on-board equipment associated with the first authentication are the IVI 13, the seat 17, the mirror 18, the steering wheel 15, the meter 14, the HUD 16, and the air conditioning device 19. The functions of the on-board equipment associated with the first authentication were described above and are therefore omitted.

The process proceeds to Step S107, and the control unit 22 refers to the storage device 30 to read, from among the setting data of the user A authenticated by using the first authentication, the setting data related to the on-board equipment and the functions of the on-board equipment associated with the first authentication. The process proceeds to Step S109, and the control unit 22 controls the on-board equipment and the functions of the on-board equipment based on the read setting data.

If the seat occupancy sensor 50 detects that the user A has boarded the vehicle 1 (YES in Step S111), the process proceeds to Step S113. On the other hand, if it is not detected that the user A has boarded the vehicle 1 (NO in Step S111), the process waits.

In Step S113, the camera 11 photographs the face of the user A and outputs the image to the authentication unit 21. The authentication unit 21 refers to the storage device 30 in order to determine whether the facial data in the image are registered in the database. If the facial data are registered in the database (YES in Step S115), the process proceeds to Step S117. On the other hand, if the facial data are not registered in the database (NO in Step S115), the process proceeds to Step S133.

Here, an example in which the result of Step S115 is NO will be described. A case in which the result of Step S115 is NO is one in which the vehicle 1 is a vehicle that is rented out for a fee. In this case, the KEY ID will be the same irrespective of the user. It is thought that fewer users register facial data for vehicles that have been rented out for a fee than for privately owned vehicles. If the result of Step S115 is NO, the control unit 22 switches the function of the on-board equipment to guest mode (see FIG. 2). For example, switching to guest mode means setting the settings of the IVI 13 (volume, map view, etc.) to the default settings.

If the facial data are registered in the database, the authentication unit 21 identifies the user. Here, it is assumed that the user who boarded the vehicle 1 is authenticated as the user A (Step S117).

The process proceeds to Step S119, and it is determined whether the users are the same. Here, that the users are the same means that the user identified based on the KEY ID in Step S103 and the user identified by using facial data in Step S117 are the same. In other words, upon determining the user identified in Step S103 and the user identified in Step S117 are not the same, it is determined that the users are not the same.

As described above, the user authenticated in Step S103 is the user A. In addition, the user authenticated in Step S117 is also the user A. Thus, the processing result of Step S119 is YES.

In Step S121, the control unit 22 identifies the on-board equipment and the functions of the on-board equipment to be controlled in association with the second authentication. The process proceeds to Step S123, and the control unit 22 reads the setting data of the user A related to the on-board equipment and the functions of the on-board equipment associated with the second authentication. The process proceeds to Step S125, and the control unit 22 controls the on-board equipment and the functions of the on-board equipment associated with the second authentication based on the setting data of the user A.

A case in which the processing result of Step S119 is NO will now be described. One example is a case in which the user boarding the vehicle 1 is a family member of the user A. It is normal for family members to share a vehicle. When a vehicle is shared, there is, of course, only one key. For this reason, in Step S103, even upon determining the user operating the key is not the user A, since the user associated with the KEY ID is the user A, the user A is authenticated.

Since facial data of family members are registered, the processing result of Step S115 is YES. Then, in the processes of Steps S115 and S117, upon determining that the user boarding the vehicle 1 is not the user A. Here, it is assumed that the user boarding the vehicle 1 is authenticated to be a user B. The process proceeds to Step S127, and the control unit 22 controls the on-board equipment and the functions of the on-board equipment to be controlled. The on-board equipment and the functions of the on-board equipment in Step S127 include the on-board equipment and the functions of the on-board equipment associated with the first authentication and the on-board equipment and the functions of the on-board equipment associated with the second authentication. The control unit 22 reads setting data of the user B relating to the on-board equipment and the functions of the on-board equipment (Step S129). The control unit 22 controls the on-board equipment and the functions of the on-board equipment associated with the first authentication again using the setting data of the user B (Step S131). The reason is that in Step S109, the on-board equipment and the functions of the on-board equipment associated with the first authentication are controlled using the setting data of the user A. The setting data of the user A and the setting data of the user B are different. Therefore, in Step S131, the control unit 22 controls the on-board equipment and the functions of the on-board equipment associated with the first authentication again using the setting data of the user B. In addition, the control unit 22 also controls the on-board equipment and the functions of the on-board equipment associated with the second authentication using the setting data of the user B (Step S131). This reflects the settings of the user B that actually boards the vehicle 1.

It has been described that the on-board equipment associated with the first authentication is the IVI 13, the seat 17, the mirror 18, the steering wheel 15, the meter 14, the HUD 16, and the air conditioning device 19, but no limitation is imposed thereby. For example, as shown in FIG. 5, the IVI 13 may be included in the on-board equipment associated with the second authentication and not included in the on-board equipment associated with the first authentication. In this manner, the on-board equipment associated with the first authentication and the on-board equipment associated with the second authentication may differ from one another without overlap.

Action and Effects

As described above, the following actions and effects can be achieved by using the on-board equipment control device 10 according to the present embodiment.

The on-board equipment control device 10 comprises the storage device 30 mounted in the vehicle 1 and the controller 20 mounted in the vehicle 1. The storage device 30 stores the on-board equipment or the functions of the on-board equipment associated with the first authentication and the on-board equipment or the functions of the on-board equipment associated with the second authentication. In addition, the storage device 30 stores setting data for controlling the on-board equipment or the functions of the on-board equipment associated with the user. The controller 20 performs the first authentication based on a signal transmitted from a wireless device held by the user and performs the second authentication based on the user's biometric data. The controller 20 reads the first setting data based on the first authentication by referring to the storage device 30 and uses the first setting data to control the on-board equipment or the functions of the on-board equipment. The controller 20 reads the second setting data based on the second authentication by referring to the storage device 30 and uses the second setting data to control the on-board equipment and the functions of the on-board equipment. According to the present embodiment, the on-board equipment and the functions of the on-board equipment are controlled before the user boards the vehicle. As a result, when the user boards the vehicle, the IVI 13, the meter 14, the steering wheel 15, the HUD 16, the seat 17, the mirror 18, and the air conditioning device 19 can be in an already-adjusted state. That is, by the present embodiment, quick control of on-board equipment and the functions of the on-board equipment is realized.

The first authentication is executed before the user boards the vehicle 1, and the second authentication is executed after the user boards the vehicle 1. As a result, it becomes possible for the controller 20 to control the on-board equipment and the functions of the on-board equipment associated with the first authentication before the user boards the vehicle.

The signals transmitted from the wireless device includes an identification signal transmitted from the wireless device by using short-range communication with the vehicle 1. The biometric data are facial data obtained by photographing the user's face. The short-range communication is wireless communication. The controller 20 receives this identification signal in order to control the on-board equipment and the functions of the on-board equipment. In other words, control of the on-board equipment and the functions of the on-board equipment is performed by remote control by the user. The on-board equipment and the functions of the on-board equipment are thus controlled before the user boards the vehicle.

In addition, the controller 20 identifies the user associated with the identification signal and identifies the user associated with the facial data. It thus becomes possible to identify the user.

The on-board equipment and the functions of the on-board equipment associated with the first authentication is controlled regardless of the result of the second authentication. Quick control of the on-board equipment and the functions of the on-board equipment is thus realized. The on-board equipment and the functions of the on-board equipment associated with the second authentication is controlled using the setting data of the user identified by using the first and second authentications. This allows the user's desired settings to be realized.

Upon determining the user identified by using the first authentication and the user identified by using the second authentication are different, the controller 20 uses the setting data of the user identified by using the second authentication to control the on-board equipment and the functions of the on-board equipment associated with the second authentication. This reflects the settings of the user that actually boards the vehicle 1.

Upon determining the user identified by using the first authentication and the user identified by using the second authentication are different, the controller 20 uses the setting data of the user identified by using the second authentication to again control the on-board equipment and the functions of the on-board equipment controlled using the setting data of the user identified by using the first authentication. This reflects the settings of the user that actually boards the vehicle 1.

The on-board equipment control device 10 further comprises the seat occupancy sensor 50 that detects that a user has sat down When the seat occupancy sensor 50 detects that a user has sat down the controller 20 starts authentication based on facial data.

The wireless device is an electronic key device or a mobile communication device. An example of the electronic key device is an intelligent key. An example of the mobile communication device is a smartphone.

The on-board equipment associated with the first authentication includes at least one of the meter 14, the steering wheel 15, the HUD 16, the seat 17, the mirror 18, and the air conditioning device 19. The on-board equipment associated with the second authentication includes at least equipment that has a navigation function. A device that has a navigation function means the IVI 13.

The functions of the on-board equipment associated with the first authentication include at least one of the view settings of the meter 14, the position or angle settings of the steering wheel 15, the view settings of the HUD 16, the position or angle settings of the seat 17, the position or angle settings of the mirror 18, and the temperature settings of the air conditioning device 19. The functions of the on-board equipment associated with the second authentication include auto-login of the equipment that has a navigation function.

The setting data stored in the storage device 30 are data that have been set previously for the on-board equipment by the authenticated user.

MODIFIED EXAMPLE

A modified example will now be described with reference to FIGS. 6-7.

In the embodiment described above, when the first authentication or the second authentication is carried out, the on-board equipment is automatically controlled. In the modified example, when the first authentication or the second authentication is carried out, the on-board equipment is controlled when a prescribed set of conditions is met. In other words, if the prescribed set of conditions is not met, the on-board equipment is not controlled. The prescribed set of conditions will be described below. This prescribed set of conditions may be determined after the first authentication is carried out or determined after the second authentication is carried out. After the second authentication is carried out means after the first authentication and the second authentication are carried out.

Figure 6:
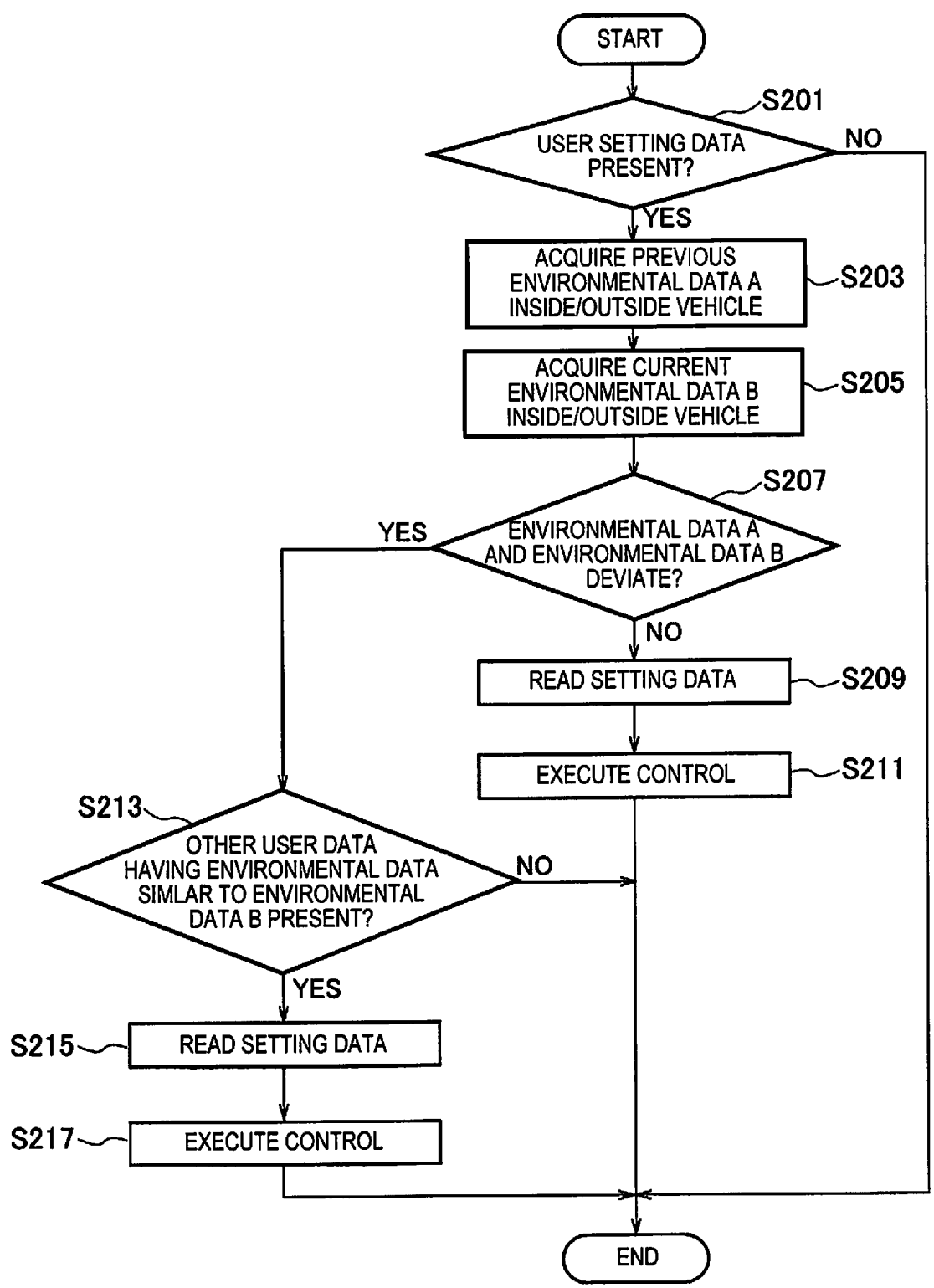
FIG. 6 is a flowchart explaining an operation example of a modified example.

In Step S201 shown in FIG. 6, it is determined whether the setting data of the user A are stored in the storage device 30. If the result is NO in Step S201, the series of processes is ended. If the result is YES in Step S201, the process proceeds to Step S203.

In Step S203, the controller 20 refers to the storage device 30 in order to acquire previous environmental data inside the vehicle and previous environmental data outside of the vehicle. Previous means the previous time of driving. The environmental data inside the vehicle includes the clothing worn by the occupant, the body temperature of the occupant, the number of occupants, the interior temperature of the vehicle, etc. The environmental data outside of the vehicle include the date and time, the time of day, day of the week, season, weather, etc., when the vehicle was driven. These pieces of previous environmental data are referred to as environmental data A.

The process proceeds to Step S205, and the controller 20 acquires the current environmental data inside the vehicle and the current environmental data outside of the vehicle. These pieces of current environmental data are referred to as environmental data B. The process proceeds to Step S207, and the environmental data A and the environmental data B are compared. As a result of the comparison, if the data deviate (YES in Step S207), the process proceeds to Step S213. On the other hand, if the data do not deviate (NO in Step S207), the process proceeds to Step S209. Using the season as an example, the data are considered to have deviated if the previous data indicate summer and the current data indicate winter.

In Step S209, the setting data of the authenticated user A are read. In Step S211, the controller 20 uses the read setting data to control the on-board equipment and the functions of the on-board equipment.

In Step S213, it is determined whether there are other user data having environmental data similar to the current environmental data B. Other user data are, for example, data with respect to the family members of the user A. If the result is YES in Step S213, the process proceeds to Step S215. In Step S215, the setting data of other users are read. In Step S217, the controller 20 uses the read setting data to control the on-board equipment and the functions of the on-board equipment.

On the other hand, if the result is NO in Step S213, the series of processes is terminated. That is, if the result is NO in Step S213, the on-board equipment and the functions of the on-board equipment are not controlled. The reasons they are not controlled will be explained. As shown in FIG. 7, when HVAC (Heating, Ventilation, and Air conditioning) is controlled, the clothing worn by the occupant, the temperature inside the vehicle, the weather outside of the vehicle, etc., are used as environmental data. At this time, if the previous data and the current data deviate (summer and winter described above), control using the previous data is not appropriate control. If control using the previous data is carried out, the user may experience discomfort. Therefore, if the result is NO in Step S213, the on-board equipment and the functions of the on-board equipment are not controlled.

Similarly, in regard to display brightness, if the previous data and the current data deviate with respect to the weather outside the vehicle, the brightness inside the vehicle, etc., control using the previous data is not appropriate control. An example of such a case is when the previous data relating to weather represent morning and the current data represent night.

Similarly, an audio playlist will be different when there is one occupant and when there is a plurality of occupants. Similarly, the audio volume is different when there is one occupant and when there is a plurality of occupants. For example, the volume will be higher when there is only one occupant compared to when there is a plurality of occupants. The auto-login of the IVI 13 relates to privacy. For this reason, when there is a plurality of occupants, the auto-login function is preferably off.

The "prescribed set of conditions" described above means that other user data having environmental data similar to the current environmental data B exists. That the "prescribed set of conditions is not met" means that other user data having environmental data similar to the current environmental data B does not exist.

Action and Effects

As described above, the following actions and effects can be achieved by way of the modified example.

The controller 20 compares the setting data stored in the storage device 30 and the current environmental data B. The setting data are associated with the previous environmental data A. That is, the controller 20 compares the previous environmental data A and the current environmental data B. Based on the comparison result, the controller 20 determines whether to control the on-board equipment and the functions of the on-board equipment associated with the first authentication and the on-board equipment and the functions of the on-board equipment associated with the second authentication. If the previous data and the current data deviate, the controller 20 does not control the on-board equipment and the functions of the on-board equipment. This prevents inappropriate control.

When the setting data are stored, the environmental data are stored in the storage device 30 in association with the setting data.

Each of the functions described in the embodiments above may be implemented by using one or more processing circuits. The processing circuits include programmed processing devices, such as processing devices including electrical circuits. The processing circuits also include such devices as application-specific integrated circuits (ASIC) and electronic components arranged to execute the described functions.

Embodiments of the present invention have been described above, but the descriptions and figures that form part of this disclosure should not be understood to limit the present invention. Various alternative embodiments, examples, and operating techniques will be apparent to those skilled in the art from this disclosure.

The control of the functions of the on-board equipment may be expressed differently as the control of the parameters of the on-board equipment.

DESCRIPTIONS OF THE REFERENCE SYMBOLS

1 Vehicle
10 On-board equipment control device
11 Camera
14 Meter
15 Steering wheel
16 HUD
17 Seat
18 Mirror
19 Air conditioning device
20 Controller
21 Authentication unit
22 Control unit
30 Storage device
50 Seat occupancy sensor

The invention claimed is:

1. An on-board equipment control device comprising:
a storage device mounted in a vehicle; and
a controller mounted in the vehicle, wherein
the storage device is configured to
store first on-board equipment or first functions of the first on-board equipment associated with a first authentication and second on-board equipment or second functions of the second on-board equipment associated with a second authentication, and
store first setting data for controlling the first on-board equipment or the first functions of the first on-board equipment and second setting data for controlling the second on-board equipment or the second functions of the second on-board equipment, the first setting data and the second setting data being stored in association with each of a plurality of preregistered users,
the controller is configured to
perform the first authentication based on a signal transmitted from a wireless device held by a user before the user boards the vehicle, a result of the first authentication identifying one user among the plurality of preregistered users,
read first setting data associated with the one user based on the result of the first authentication by referring to the storage device,
use the first setting data associated with the one user to control the first on-board equipment or the first functions of the on-board equipment,
perform the second authentication based on biometric data of the user after the user boards the vehicle, a result of the second authentication identifying the one user among the plurality of preregistered users, identifying another user among the plurality of preregistered users, or indicating that the user is not preregistered,
read second setting data based on the result of the second authentication by referring to the storage device,
use the second setting data in order to control the second on-board equipment or the second functions of the on-board equipment,
determine whether the result of the first authentication and the result of the second authentication identify the same user or different users among the plurality of preregistered users,
upon determining that the result of the first authentication and the result of the second authentication identify different users among the plurality of preregistered users, read the first setting data associated with the user identified by the second authentication and use the first setting data associated with the user identified by the second authentication to control the first on-board equipment or the first functions of the first on-board equipment.

2. The on-board equipment control device according to claim 1, wherein
the signal transmitted from the wireless device includes an identification signal transmitted from the wireless device by using short-range communication with the vehicle, and
the biometric data are facial data obtained by photographing the user's face.

3. The on-board equipment control device according to claim 2, wherein
the controller is configured to
identify the user associated with the identification signal, and
identify the user associated with the facial data.

4. The on-board equipment control device according to claim 1, wherein
the first on-board equipment or the first functions of the first on-board equipment associated with the first authentication are controlled regardless of a result of the second authentication, and
the second on-board equipment or the second functions of the on-board equipment associated with the second authentication are controlled using setting data of a user identified by using the first and second authentications.

5. The on-board equipment control device according to claim 1, wherein
upon determining the user identified by using the first authentication and the user identified by using the second authentication are different, the controller uses the second setting data for the user identified by using the second authentication to control the second on-board equipment or the second functions of the second on-board equipment associated with the second authentication.

6. The on-board equipment control device according to claim 3, further comprising
a sensor is configured to detect whether the user has sat down,
the controller being configured to start authentication based on the facial data when the sensor detects that the user has sat down.

7. The on-board equipment control device according to claim 1, wherein
the controller is further configured to determine whether to control the first on-board equipment or the first functions of the first on-board equipment associated with the first authentication and the second on-board equipment or the second functions of the on-board equipment associated with the second authentication based on a result of comparing the setting data stored in the storage device and current environmental data.

8. The on-board equipment control device according to claim 1, wherein
the wireless device is an electronic key device or a mobile communication device.

9. The on-board equipment control device according to claim 1, wherein
the first on-board equipment associated with the first authentication includes at least one of a meter, a steering wheel, a head-up display, a seat, a mirror, and an air conditioning device, and
the second on-board equipment associated with the second authentication includes at least equipment that has a navigation function.

10. The on-board equipment control device according to claim 9, wherein
the first functions of the on-board equipment associated with the first authentication include at least one of view settings of the meter, position or angle settings of the steering wheel, view settings of the head-up display, position or angle settings of the seat, position or angle settings of the mirror, and temperature settings of the air conditioning device, and
the second functions of the on-board equipment associated with the second authentication include auto-login of equipment having the navigation function.

11. The on-board equipment control device according to claim 1, wherein
the setting data stored in the storage device are data that have been set previously for the on-board equipment by the authenticated user.

12. The on-board equipment control device according to claim 6, wherein
the controller is configured to store environmental data in the storage device at a time that the setting data are stored.

13. An on-board equipment control method for a vehicle mounted control device comprising a storage device mounted in a vehicle, and a controller mounted in the vehicle, the on-board equipment control method comprising:
storing first on-board equipment or first functions of the first on-board equipment associated with a first authentication;
storing second on-board equipment or second functions of the second on-board equipment associated with a second authentication;
storing first setting data for controlling the first on-board equipment or the first functions of the first on-board equipment, the first setting data being stored in association with each of a plurality of preregistered users;
storing second setting data for controlling the second on-board equipment or the second functions of the second on-board equipment, the second setting data being stored in association with each of the plurality of preregistered users;
performing the first authentication using the controller based on a signal transmitted from a wireless device held by a user before the user boards the vehicle, a result of the first authentication identifying one user among the plurality of preregistered users;
reading first setting data associated with the one user based on the result of the first authentication by referring to the storage device;
controlling the first on-board equipment or the first functions of the on-board equipment using the first setting data associated with the one user;
performing the second authentication using the controller based on biometric data of the user after the user boards the vehicle, a result of the second authentication identifying the one user among the plurality of preregistered users, identifying another user among the plurality of preregistered users, or indicating that the user is not preregistered;
reading second setting data based on the result of the second authentication by referring to the storage device;
controlling the second on-board equipment or the second functions of the second on-board equipment using the second setting data;
determining whether the result of the first authentication and the result of the second authentication identify the same user or different users among the plurality of preregistered users; and
upon determining that the result of the first authentication and the result of the second authentication identify different users among the plurality of preregistered users, read the first setting data associated with the user identified by the second authentication and use the first setting data associated with the user identified by the second authentication to control the first on-board equipment or the first functions of the first on-board equipment.

* * * * *